United States Patent
Childers

(10) Patent No.: US 9,616,679 B2
(45) Date of Patent: Apr. 11, 2017

(54) METHOD AND SYSTEM FOR EMITTING OFFSET ILLUMINATION FOR REDUCED STRAY LIGHT

(71) Applicant: Phoseon Technology, Inc., Hillsboro, OR (US)

(72) Inventor: Doug Childers, Portland, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

(21) Appl. No.: 15/071,653

(22) Filed: Mar. 16, 2016

(65) Prior Publication Data

US 2016/0193851 A1 Jul. 7, 2016

Related U.S. Application Data

(63) Continuation of application No. 14/558,583, filed on Dec. 2, 2014, now Pat. No. 9,346,288.

(60) Provisional application No. 61/912,477, filed on Dec. 5, 2013.

(51) Int. Cl.
| | | |
|---|---|---|
| *B41J 11/00* | (2006.01) | |
| *B41J 2/47* | (2006.01) | |
| *G02B 27/09* | (2006.01) | |
| *F21V 5/04* | (2006.01) | |
| *F21V 17/00* | (2006.01) | |
| *G01J 1/44* | (2006.01) | |
| *F21W 131/403* | (2006.01) | |
| *F21Y 103/10* | (2016.01) | |
| *F21Y 115/10* | (2016.01) | |

(52) U.S. Cl.
CPC ............... *B41J 2/47* (2013.01); *B41J 11/002* (2013.01); *F21V 5/043* (2013.01); *F21V 5/045* (2013.01); *F21V 17/002* (2013.01); *G01J 1/44* (2013.01); *G02B 27/0955* (2013.01); *F21W 2131/403* (2013.01); *F21Y 2103/10* (2016.08); *F21Y 2115/10* (2016.08)

(58) Field of Classification Search
CPC ...... B41J 2/47; G02B 27/1086; G02B 27/123; B23K 26/0738
See application file for complete search history.

(56) References Cited

U.S. PATENT DOCUMENTS

| | | |
|---|---|---|
| 5,808,800 A | 9/1998 | Handschy et al. |
| 6,227,669 B1 | 5/2001 | Tiao et al. |
| 6,297,875 B1 | 10/2001 | Nishikawa |
| | (Continued) | |

OTHER PUBLICATIONS www.photonics.com/images/Web/Articles/2006/12/1/CVI_Fig3_polarizingprisms.jpg, Dec. 1, 2006, Retrieved Jul. 28, 2015, 1 page.

(Continued)

*Primary Examiner* — Stephen Meier
*Assistant Examiner* — John P Zimmermann
(74) *Attorney, Agent, or Firm* — McCoy Russell LLP

(57) ABSTRACT

A method for example of irradiating a light-curable material, may comprise irradiating light about a first axis from an array of light-emitting elements towards a light-curable surface, directing the irradiated light through an optical element interposed between the array of light-emitting elements and the light-curable surface, wherein a central axis of the optical element is offset from the first axis, and deflecting the irradiated light directed through the optical element asymmetrically away from the first axis towards the light-curable surface.

19 Claims, 14 Drawing Sheets

(56) References Cited

U.S. PATENT DOCUMENTS

| | | | |
|---|---|---|---|
| 6,463,083 B1* | 10/2002 | Sumiyoshi | B23K 26/06 |
| | | | 372/6 |
| 6,739,716 B2 | 5/2004 | Richards | |
| 7,137,695 B2 | 11/2006 | Yokoyama | |
| 7,674,999 B2* | 3/2010 | Jennings | B23K 26/0613 |
| | | | 219/121.65 |
| 7,934,802 B2 | 5/2011 | Nakata et al. | |
| 8,573,767 B2 | 11/2013 | Edlitz et al. | |
| 8,585,198 B2* | 11/2013 | Onishi | B41J 11/002 |
| | | | 347/102 |
| 2004/0119772 A1* | 6/2004 | Hoshino | B41J 11/002 |
| | | | 347/19 |
| 2004/0135874 A1 | 7/2004 | Oehlbeck et al. | |
| 2007/0030676 A1 | 2/2007 | Ichihara | |
| 2008/0094460 A1 | 4/2008 | Nakata et al. | |
| 2009/0213200 A1 | 8/2009 | Sugai | |
| 2012/0007912 A1* | 1/2012 | Kagose | B41J 11/002 |
| | | | 347/20 |
| 2013/0106966 A1 | 5/2013 | Thompson | |

OTHER PUBLICATIONS

ISA Korean Intellectual Property Office, International Search Report and Written Opinion Issued in Application No. PCT/US2014/068341, Mar. 24, 2015, WIPO, 16 pages.

\* cited by examiner

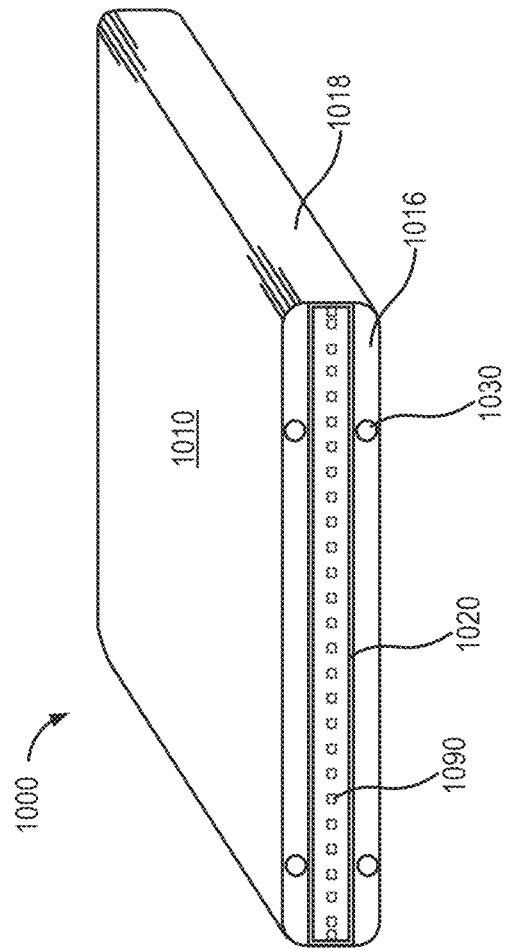

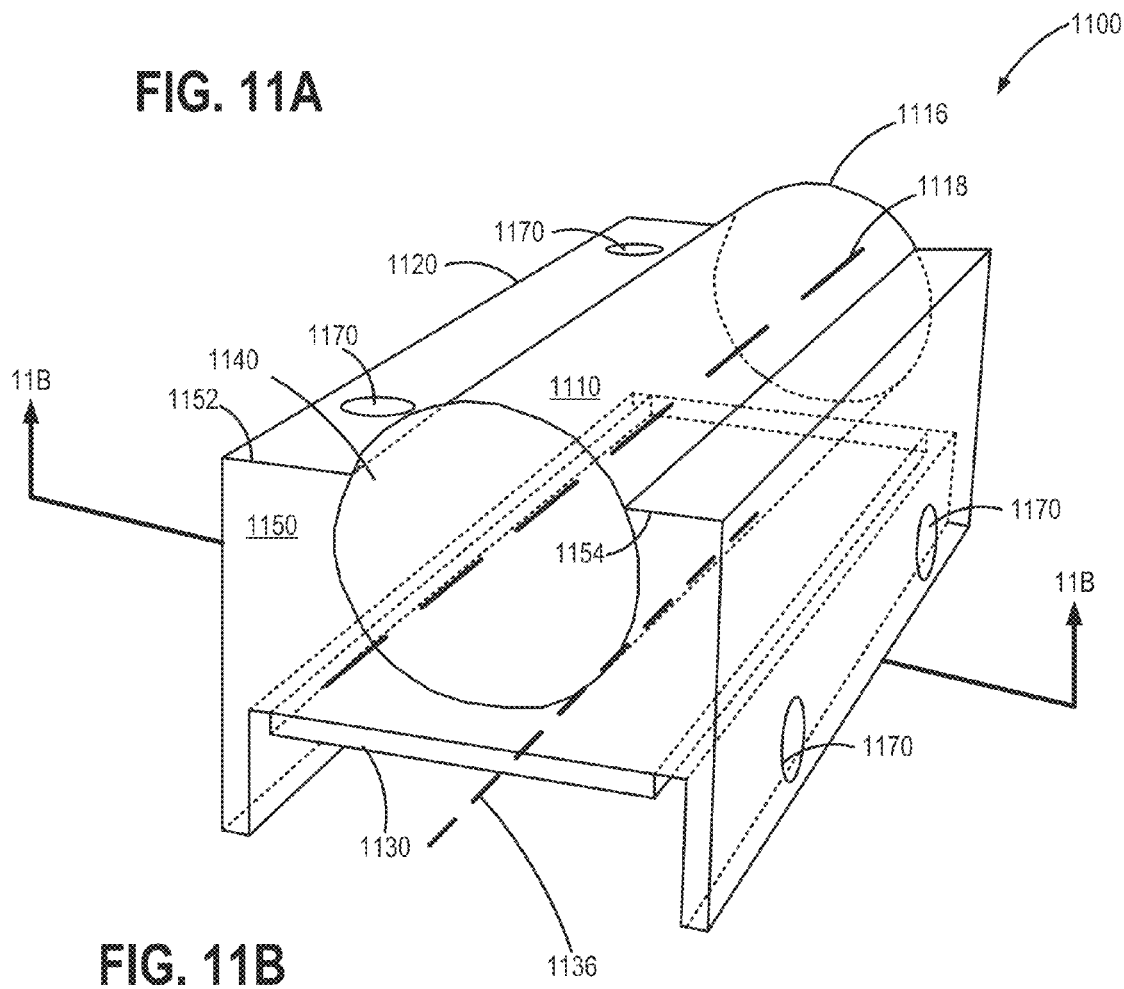
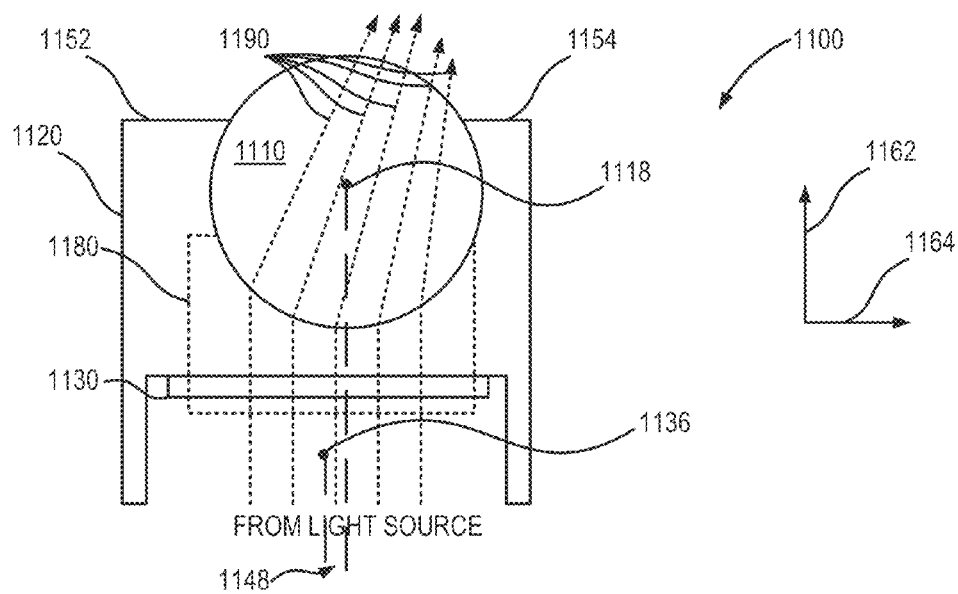

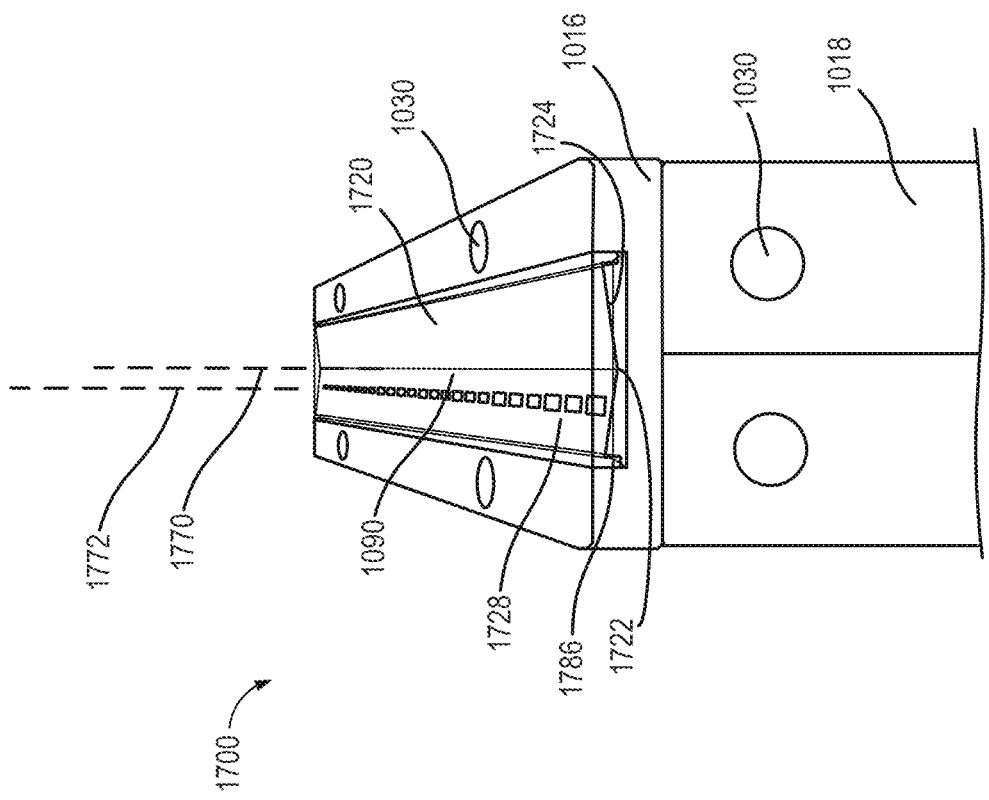

METHOD AND SYSTEM FOR EMITTING OFFSET ILLUMINATION FOR REDUCED STRAY LIGHT

CROSS REFERENCE TO RELATED APPLICATIONS

The present application is a continuation of U.S. patent application Ser. No. 14/558,583, entitled "METHOD AND SYSTEM FOR EMITTING OFFSET ILLUMINATION FOR REDUCED STRAY LIGHT," and filed on Dec. 2, 2014, which claims priority to U.S. Provisional Application No. 61/912,477, entitled "METHOD AND SYSTEM FOR EMITTING OFFSET ILLUMINATION FOR REDUCED STRAY LIGHT," and filed on Dec. 5, 2013, the entire contents of each of which are hereby incorporated by reference for all purposes.

BACKGROUND AND SUMMARY

Conventional printing and curing systems and methods may comprise applying and curing light-curable materials such as UV-curable ink, and the like to a substrate such as a polymer film or paper. In particular, a light-curable material, such as ink, may first be applied to the substrate via a printer head. Subsequently, the light-curable material may be cured onto the substrate using a light source. In conventional systems, the printer head is positioned adjacent to the light source so that the light-curable material may be expediently cured following application of the light-curable material onto the substrate via the printer head. Accordingly, a portion of the light emitted from the light source may be reflected back onto the printer head after striking the target substrate, causing curing of the light-curable material (e.g., light-curable ink) at the printer head surface before it can be applied to the target substrate, and leading to accelerated printer head degradation. A conventional approach to alleviating curing of ink at the printer head includes positioning the printer head (and light source) at an increased distance from the substrate so that reflected light from the target substrate incident at the printer head is attenuated. Another conventional approach includes using baffles positioned to block the portion of emitted light from the light source that can potentially be reflected onto the printer head, and baffles positioned to block reflected light before it can reach the print head.

The inventors herein have recognized potential issues with the above approaches. Namely, increasing the distance of the printer head from the substrate can attenuate the irradiance of light at the substrate surface, resulting in longer curing times and lower system efficiency. Furthermore, the use of baffles increases the cost and complexity of the apparatus setup, and the presence of baffles in the vicinity of the printer head and light source can interfere with printing reliability and light emission at the light-curable surface.

One approach that at least partially addresses the above issues includes a method of irradiating a light-curable material, comprising irradiating light about a first axis from an array of light-emitting elements towards a light-curable surface, directing the irradiated light through an optical element interposed between the array of light-emitting elements and the light-curable surface, wherein a central axis of the optical element is offset from the first axis, and deflecting the irradiated light directed through the optical element asymmetrically away from the first axis towards the light-curable surface.

In another embodiment, a printing and curing system may comprise a lighting module, including an array of light-emitting elements, coupling optics, and a controller with executable instructions to position the coupling optics over the array, wherein a central axis of the coupling optics is offset from the first axis of the array of light-emitting elements, irradiate light about a first axis from the array of light-emitting elements towards a light-curable surface, direct the irradiated light through the coupling optics, and deflect the irradiated light directed through the coupling optics asymmetrically away from the first axis towards the light-curable surface.

In a further embodiment, a lighting module may comprise an array of light-emitting elements. The array emitting light symmetrically about a first axis towards a light-curable surface, and an optical element, interposed between the array and the light-curable surface, wherein a central axis of the optical element is offset from the first axis to asymmetrically direct the emitted light from the array of light-emitting elements away from the first axis towards the light-curable substrate.

In this manner, the technical result of deflecting emitted light from the light source away from a printer head in a printing and curing system to reduce reflection of light from a target substrate to the printer head, to reduce curing of light-curable material at the printer head, and to reduce printer head degradation may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 10 is a frontal perspective view of an example light source.

FIGS. 11A and 11B illustrate a frontal perspective view and a cross-sectional view of an example optical element module.

FIG. 15 is a partial side perspective view of an example light source with a cylindrical Fresnel lens.

DETAILED DESCRIPTION

The present description relates to printer and coating system and a method of using therefor. In conventional printing and curing systems using light-curable ink, light emitted from the light source may be reflected back into the printer head after striking the target substrate, leading to curing of the ink before it can be applied to the target substrate, and printer head degradation. The inventors herein use a lens to offset or deflect the emitted light rays from a light source thereby preventing the reflected light rays from entering the print head. This configuration has the advantage of preventing the material to be cured before it reaches the target substrate.

Figure 1:
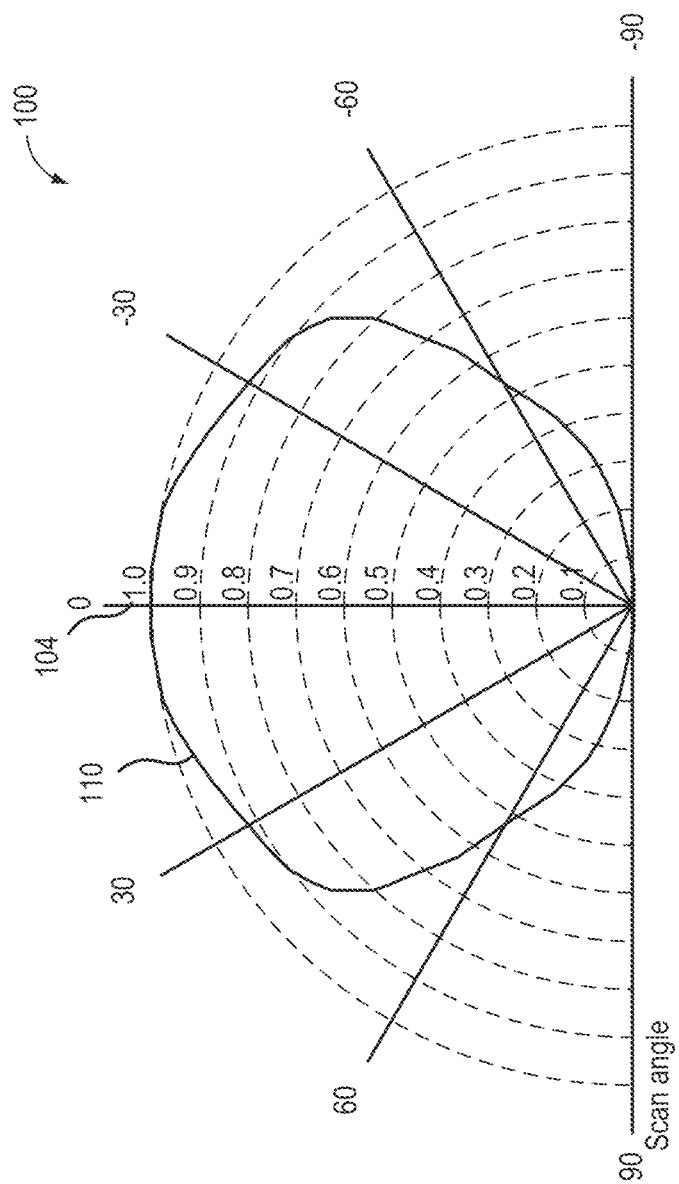
FIG. 1 illustrates an example of a near-Lambertian emission pattern.
Figure 2:
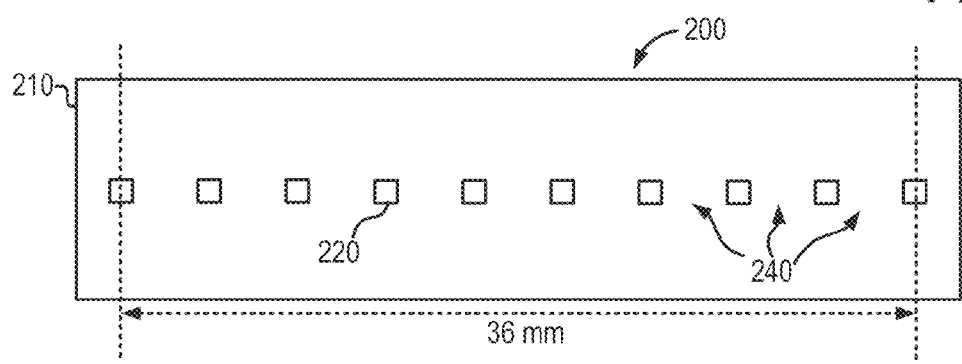
FIG. 2 is a schematic of an example of a regularly spaced linear array of light-emitting elements.
Figure 3:
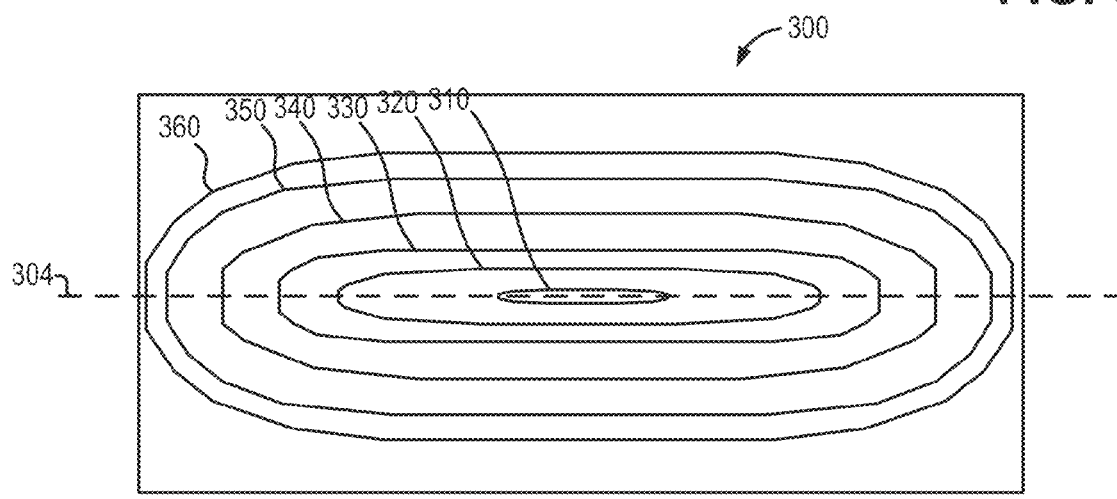
FIG. 3 is a schematic illustrating an irradiance pattern for the regularly spaced linear array of light-emitting elements of FIG. 2.
Figure 4A:
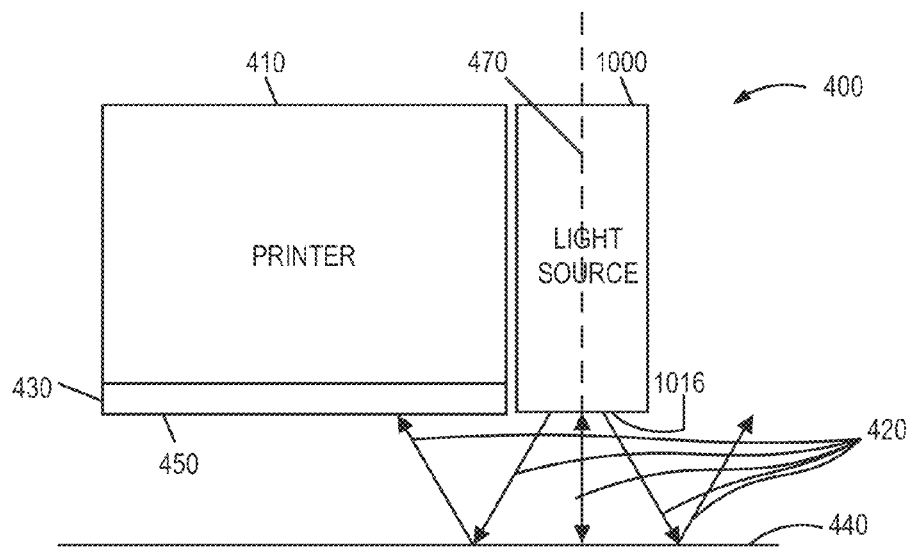
FIGS. 4A and 4B illustrate example light sources and an adjacent printer head.
Figure 4B:
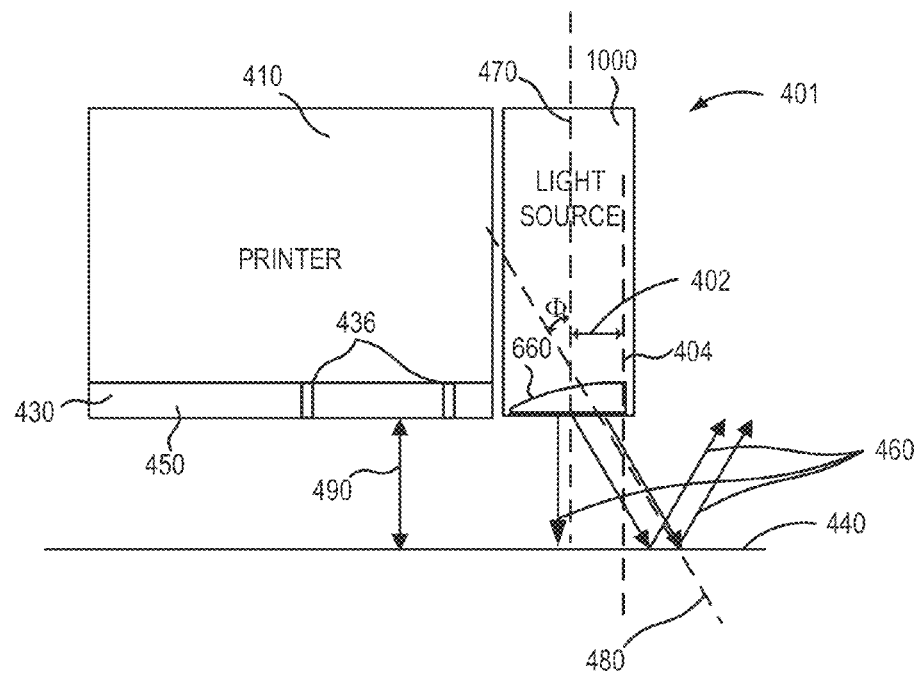
Figure 8:
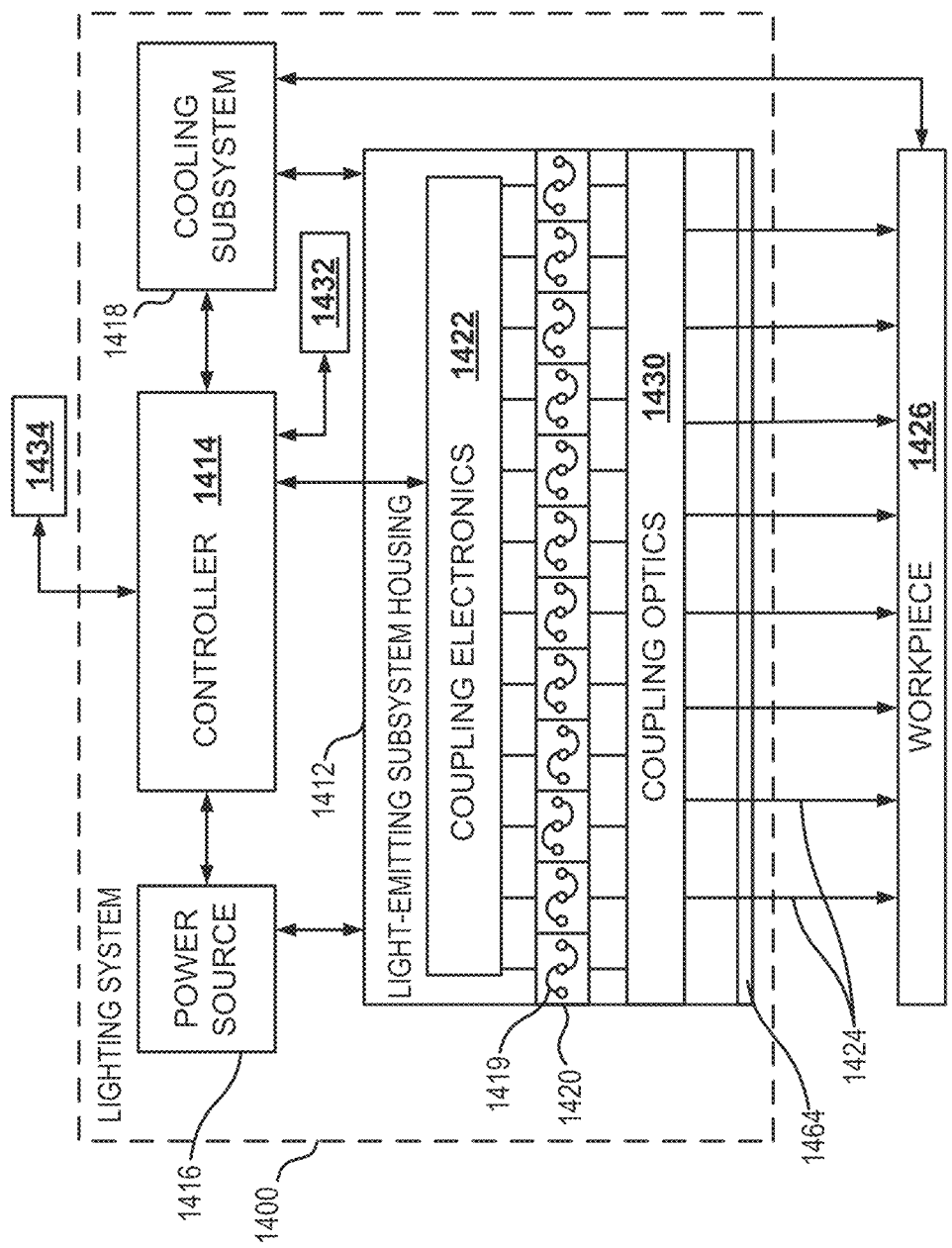
FIG. 8 is a schematic illustrating an example of a lighting system.
Figure 9:
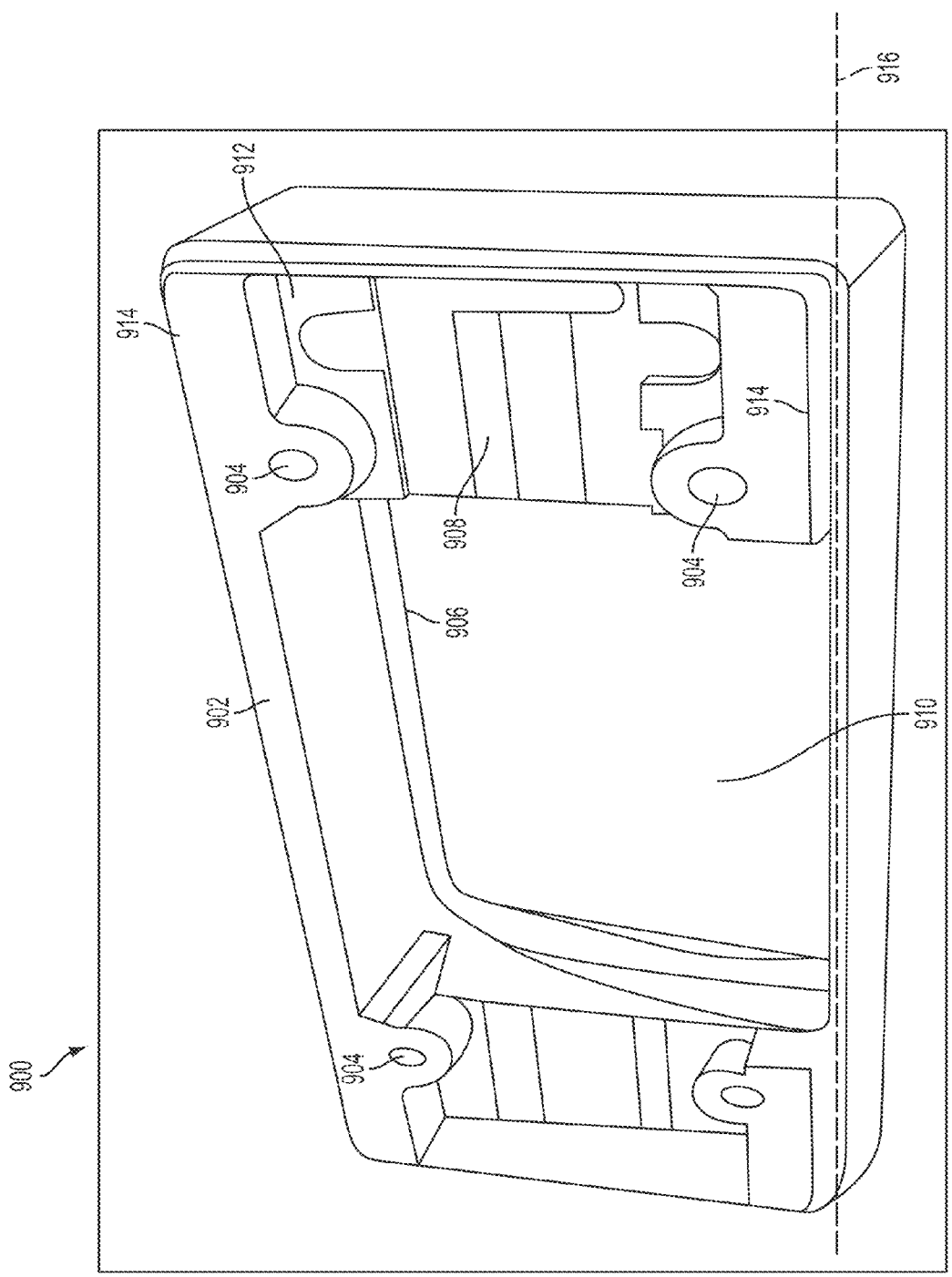
FIG. 9 illustrates an example optical element module.
Figure 12:
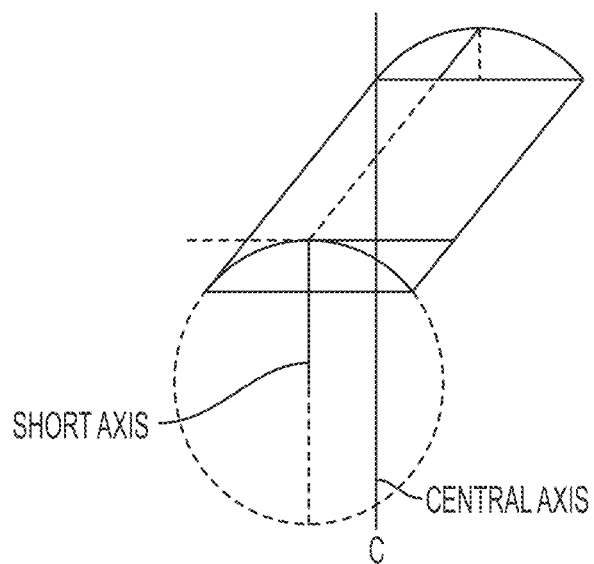
FIG. 12 illustrates a schematic showing a central axis of a lens.
Figure 13:
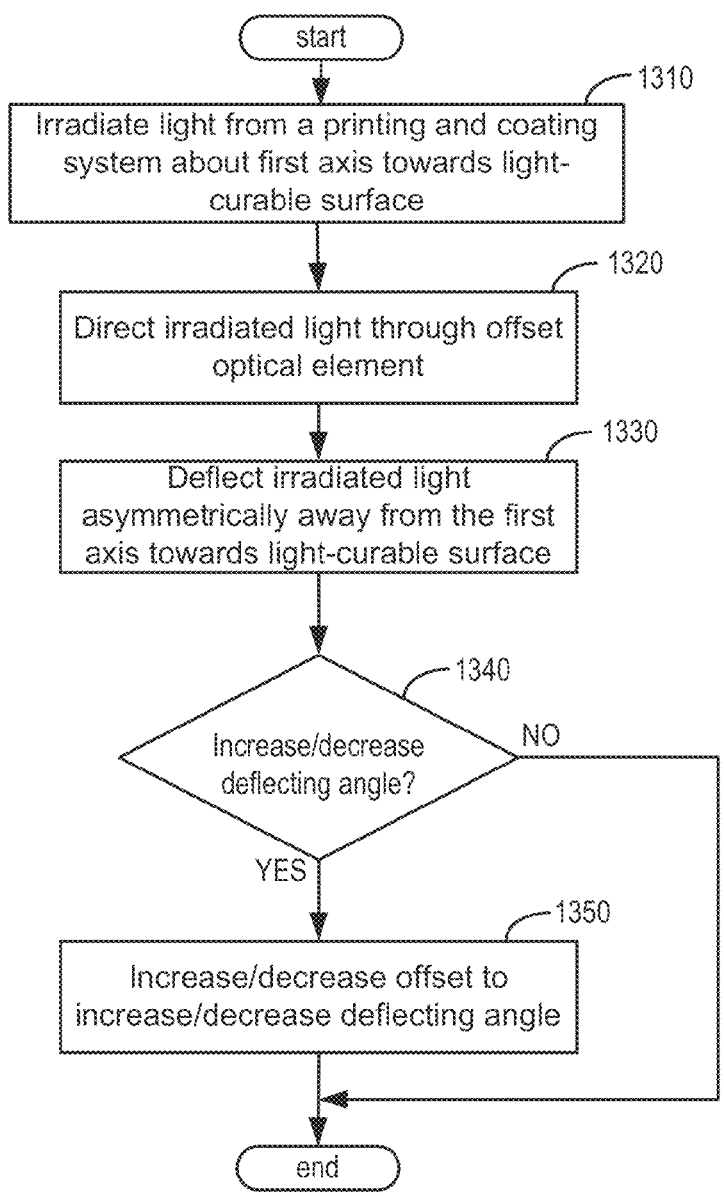
FIG. 13 is an example flow chart for a method of irradiating a light-curable coating.

FIG. 1 illustrates an example of a near-Lambertian emission pattern for an LED light-emitting element. FIG. 2 shows a schematic depicting an example of a linear array of light-emitting elements arranged in a regularly spaced manner, and FIG. 3 illustrates an example of an irradiance pattern for the regularly spaced linear array of light-emitting elements shown in FIG. 2. FIGS. 4A and 4B illustrate an example light source and printer head, with no optics and with an offset cylindrical lens, respectively. FIG. 5 shows a schematic of a side cross-sectional view of light emission from a light source. FIG. 6 shows a schematic of a side cross-sectional view of light emission from a light source including an offset cylindrical lens. FIG. 7 shows a side view of light emission (with offset rod lens). FIG. 8 is a schematic of an example configuration for a light source. FIG. 9 illustrates an example optical element module, and FIG. 10 is a frontal perspective view of an example light source. An example of an optical element module is depicted in FIGS. 11A and 11B. FIG. 12 illustrates a central axis of an optical element. FIG. 13 is an example flow chart for a method of irradiating a light-curable coating. Examples of multi-groove and single-groove cylindrical Fresnel lenses are depicted in FIGS. 14A, 14B, 14C, and 14D. FIG. 15 illustrates an example of a light source comprising a single-groove cylindrical Fresnel lens.

Turning now to FIG. 1, it illustrates an emission pattern 100 for a near-Lambertian light source such as an LED type light-emitting element. The emission pattern illustrates that the angular spread of light originating from the near-Lambertian light source is broad and symmetrically dispersed about a main light-emitting axis 104 coincident with a 0 scan angle. Furthermore, a radiant intensity profile 110 is variable as the emission angle from the light source is varied from −90° to +90°. Accordingly, a surface illuminated by a near-Lambertian light source may not be uniformly irradiated with light.

FIG. 2 illustrates a simple schematic of an example of a high aspect ratio array 200 of light-emitting elements. In one example, the light-emitting elements may comprise Lambertian light-emitting elements. As shown in FIG. 2, high aspect ratio array 200 comprises a regularly spaced 36 mm linear array of ten light-emitting elements 220. Regularly spaced implies that a spacing 240 between each light-emitting element may be the same. The light-emitting elements may be mounted on a substrate 210, for example a printed circuit board (PCB). In addition to linear arrays of light-emitting elements, high aspect ratio arrays may also include two-dimensional arrays of light-emitting elements. Two dimensional high aspect ratio arrays may comprise a first number of light-emitting elements in a first dimension and a second number of light-emitting elements in a second dimension, wherein the first number is at least much larger than the second number. For example, a 2×8 two-dimensional array of light-emitting elements may be considered a high aspect ratio array.

FIG. 3 illustrates a plot 300 of an irradiance pattern at a fixed plane located 6 mm away from the regularly spaced linear array of LEDs in FIG. 2. The irradiance pattern of plot 300 may be generated using an optical simulation program such as Zemax. Curves 310, 320, 330, 340, 350, and 360 approximate lines of constant irradiance at a surface 6 mm away from the light source oriented perpendicular to the 90° emission angle of 1.80, 1.65, 1.30, 0.90, 0.40, and 0.20 W/cm$^2$ respectively. FIG. 3 illustrates the angular spread of light emitted from the linear regular-spaced array in a widthwise axis and a lengthwise axis. Irradiance from the regularly spaced array varies across the two dimensional pattern decreasing in intensity from the center of the pattern towards the periphery. As shown in the irradiance pattern of FIG. 3, the distribution of light is broadly dispersed about a main light-emitting axis 304.

Turning now to FIG. 10, it illustrates a frontal perspective view of an example light source 1000. The light source comprises a housing 1010 containing a linear array of light-emitting elements, a window and a front cover 1016 at the front plane of the housing 1010, sidewalls 1018, and fasteners 1030. As illustrated, the light source 1000 may have a housing 1010 shaped as a square or rounded rectangular box. Other housing shapes where sidewalls extend backwards perpendicularly from the front plane of the housing and where light sources may be positioned flush when side by side may be used.

Turning to FIG. 4A, it illustrates a schematic of a printer and coating system 400, including housing 1010 of a light source 1000, such as light source 1000 described above in FIG. 10. Printer and coating system 400 may include a printer 410. Printer 410 may comprise a printer head 430 mounted and/or positioned wherein a bottom surface 450 is flush with the bottom surface (e.g., front cover 1016) of the housing 1010 of the light source 1000. Bottom surface 450 may also be referred to as the printer head surface, as the printing ink is jetted out from the printer head via bottom surface 450. As shown in FIG. 10, light is emitted from light source 1000 via front cover 1016. Accordingly, both the printing ink and the light are emitted via a common plane aligned with both the bottom surface 450 of the printer head 430 and the front cover 1016 of light source 1000. As shown in FIG. 4A, light rays 420 may be symmetrically emitted by the light source 1000 about a main light-emitting axis 470 and reflected at target substrate 440. As illustrated in FIG. 4A, some of the reflected light rays from the target substrate 440 can be reflected from the substrate back into the printer head 430, causing printer head misfiring or printer head jetting problems due to curing of the ink at the printer head nozzles. Printer head may further comprise sensors 436 distributed across the printer head for measuring light irradiated onto the printer head surface. In this way, light reflected from the target substrate 440 onto the printer head may be measured and input to a controller 1414.

Turning to FIG. 4B, it illustrates a schematic of a modified printing and curing system 401, further comprising a cylindrical lens 660 positioned inside the housing 1010 of the light source 1000. The cylindrical lens 660 is positioned such that a bottom light-emitting surface of the cylindrical lens 660 is flush or slightly recessed from the front cover 1016 such that the front cover 1016 remains flush with the bottom surface 450 of the printer head 430. As illustrated in FIG. 4B, the cylindrical lens 660 may be aligned off-axis from the light source, whereby light rays emitted from its light-emitting surface and from front cover 1016 are redirected about a tilted axis of propagation 480 (e.g., a light emitting-axis about which the emitted light rays are centrally dispersed). The tilted axis of propagation 480 is tilted or angled away from the main light emitting axis 470 of the light source. The degree of tilt (e.g., angular deflection) of the tilted axis of propagation 480 relative to the main light-emitting axis 470 may be dependent on the magnitude of the offset (e.g. off-axis alignment) of the cylindrical lens 660 relative to the main light-emitting axis 470 of the light source, as well as other factors including the shape and geometry of the cylindrical lens. The offset of the cylindrical lens 660 may be characterized by an offset of a central axis 404 of the cylindrical lens 660 by a distance 402 from the main light emitting axis 470. If a central axis of a lens is aligned with a main light-emitting axis 470 (e.g., no offset and distance 402 is zero) of the light source 1000, then emitted light rays may not be deflected away from the printer head 430.

In some examples, the central axis of the lens may pass through the physical center of the lens. The central axis may also be aligned with a longitudinal axis of the lens, the longitudinal axis of the lens passing through a longitudinal center of the lens. For example, in the case of a rotationally symmetric lens, the central axis may be perpendicular to the apex (positive lens) or valley (negative lens), typically in the physical center of the lens. In the case of a non-rotationally symmetric lens, the central axis may be the intersection of two planes defined by the apex or valley of one axis (e.g., short axis) and the apex or valley of the second axis (e.g., longitudinal axis). As shown in FIG. 12, if one axis does not have power (e.g., a cylindrical lens), then the central axis may be given by the plane perpendicular to the apex or valley of the powered axis, and the physical center of the non-powered axis.

For example, increasing the degree of offset of the cylindrical lens 660 from the main light-emitting axis 470 may increase the degree Φ of tilt of the tilted axis of propagation 480. Accordingly, the emitted light may thereby be deflected to one side of the main light-emitting axis 470, at an angle determined by the amount of offset. Deflecting the emitted or irradiated light rays may comprise one or more of refracting, reflecting, diffracting, collimating, and focusing the light rays.

As shown in FIG. 4B, reflection of the tilted and off-set reflected light rays 460 into the printer head 430 may be reduced. As such, curing of light curable material at the surface of the printer head may be mitigated and printer head degradation may be reduced. Further still, a distance 490 between the printer head and the target substrate 440 may be reduced, thereby increasing curing rates and increasing the efficiency of the printer and coating system relative to conventional systems and methods.

Turning now to FIG. 9, it illustrates a picture of an optical element module 900 for an optical element 910, the optical element 910 comprising of central axis 916. The perimeter of the optical element module 900 is delineated by an outer edge 902 of the optical element module 900 that is raised relative to a recessed lens region 906 and relative to a recessed mounting region 912. Optical element 910 can be of various geometrical configurations (e.g., rod, Fresnel, cylindrical and the like) and the recessed shape of the recessed lens region 906 may help to accommodate optical elements of various geometries. Recessed alignment region 902 may aid in aligning the optical element module 900 to a light source. For example, the optical elements can be secured in position by fasteners which may be positioned in the fastener holders 904. The recessed alignment region may further comprise a plurality of adjustment ridges 908. Aligning a mounting edge of the optical element 910 to one or more of the adjustment ridges 908 may aid in positioning the optical element 910 to achieve a particular offset distance 402 between the central axis 916 of the optical element 910 and the main light-emitting axis of the emitted light rays as described above with reference to FIG. 4B. Furthermore, the optical element module 900 may include one or more spacing supports 914, located near the outer edge 902 of the optical element module 900. The spacing supports 914 may provide additional support to secure the optical element 910 in the optical element module 900.

Figure 5A:
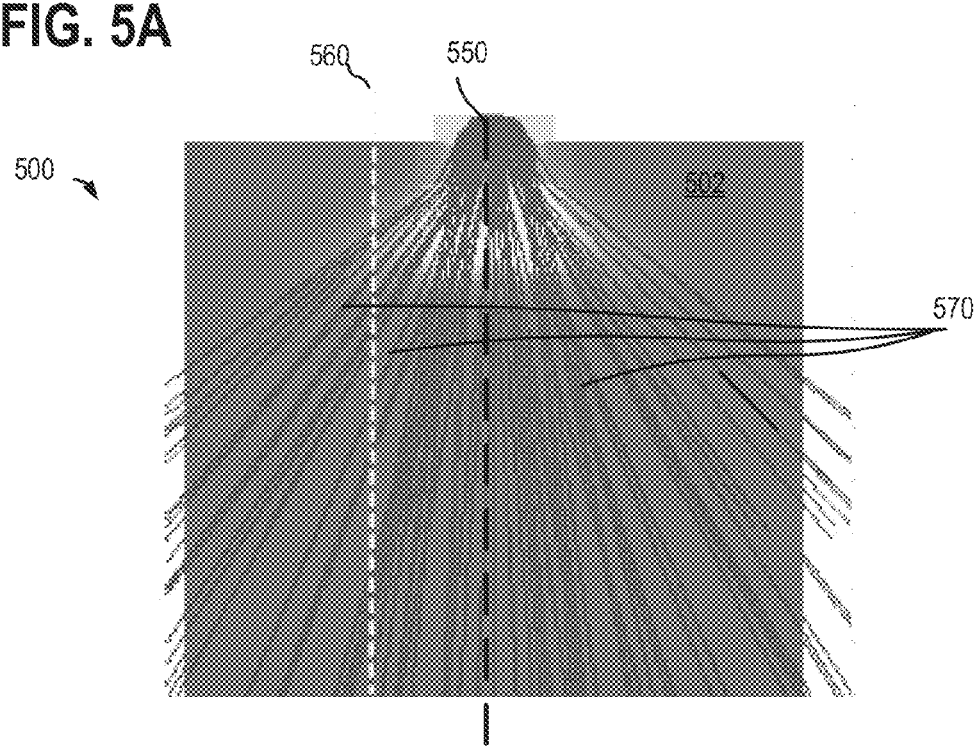
FIGS. 5A and 5B are side cross-sectional views of a light emission pattern from a light source.
Figure 5B:
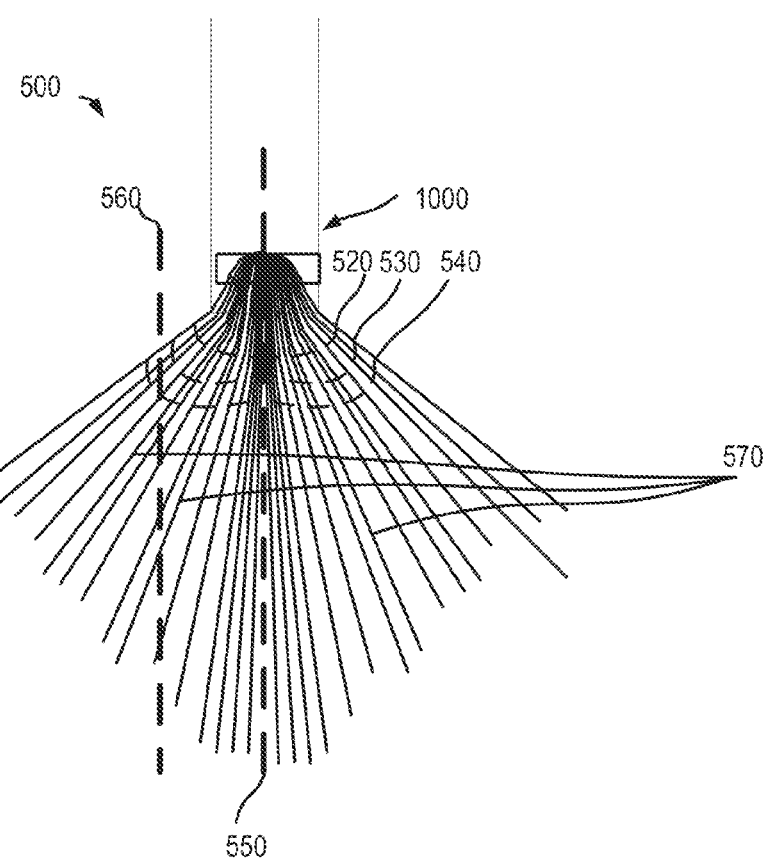

FIGS. 5A and 5B are illustrations showing cross-sectional views along a longitudinal axis of a high aspect ratio array of light-emitting elements. Similar to high aspect ratio array 200 of FIG. 4A described above in FIG. 2, the light-emitting elements may emit light having a near Lambertian profile about a main emitting axis 550. Printing axis 560 parallel to the main emitting axis 550 shows an example path travelled by printing ink after being dispensed from the printer head to the substrate, wherein the printer head may be positioned adjacent to light source 1000, as shown in FIG. 4A. Thus, in accordance with FIGS. 4A and 4B, a printer head and printer head surface dispensing ink may be positioned along printing axis 560 and at a position coplanar with light emitting surface of front cover 1016.

FIG. 5A further illustrates a shaded light intensity spectrum 502 of light emitted from light source 1000. As shown in FIG. 5A, the light intensity is most concentrated a short distance from light source 1000, and disperses quickly at distances further from light source 1000. FIG. 5B is an illustration superimposing the light intensity spectrum 502 of FIG. 5A as linear contours 520, 530, and 540 in schematic form.

As shown in FIG. 5B, light rays 570, extend symmetrically about both sides of main light-emitting axis 550, including extending beyond printing axis 560. A situation similar to FIG. 4A is represented wherein the light rays travelling beyond printing axis 560 may be reflected from the substrate to the printer head.

Figure 6B:
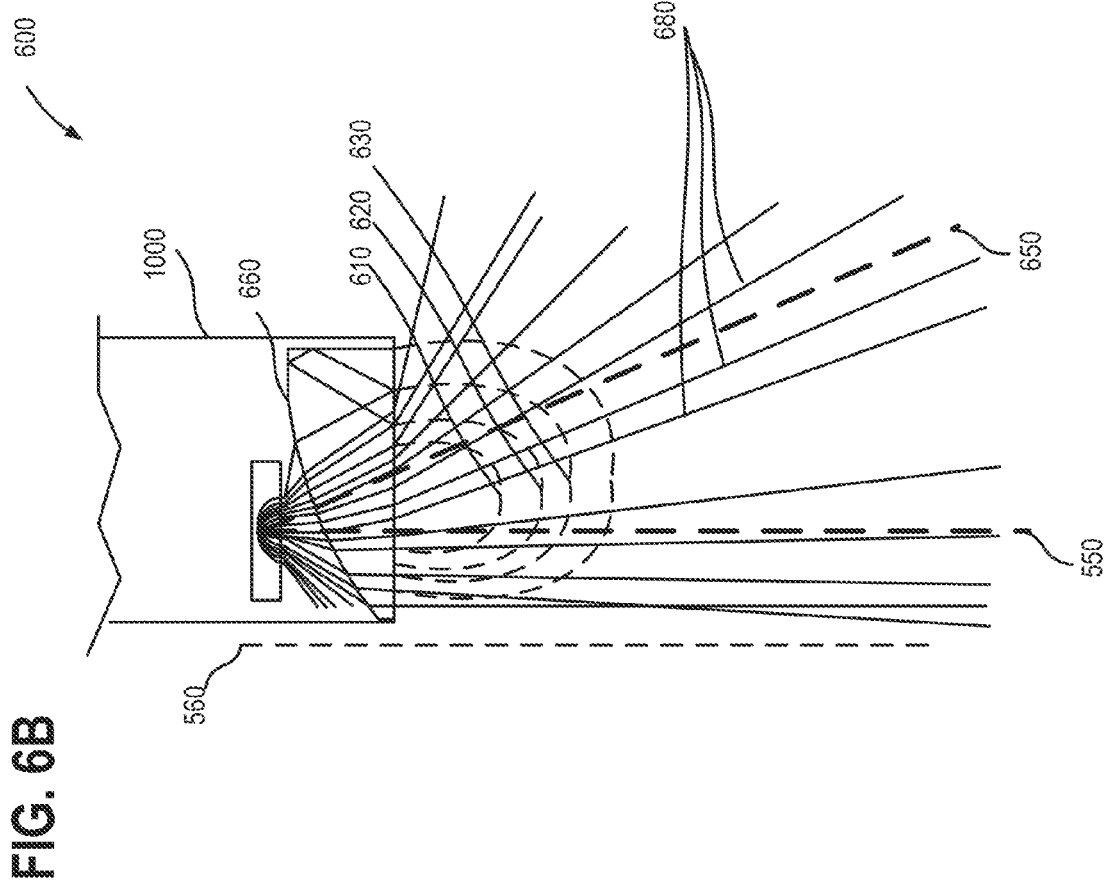
FIGS. 6A and 6B are side cross-sectional views of a light emission pattern from a light source.
Figure 6A:
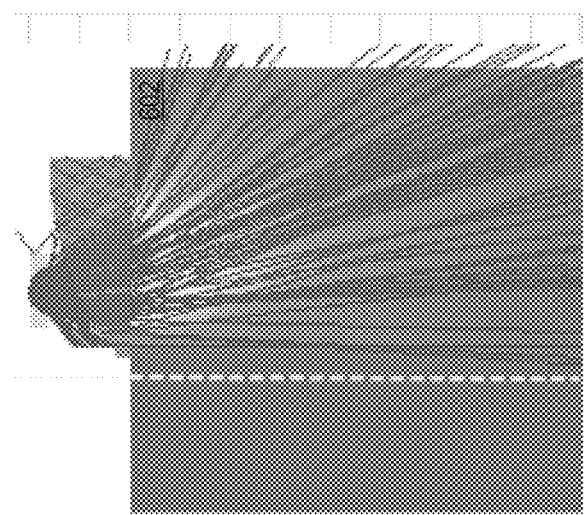

FIGS. 6A and 6B, show side cross-sectional views of light emission spectrum from a light source with offset cylindrical lens 660. FIG. 6A further illustrates a shaded light intensity spectrum 602 of light emitted from light source 1000. FIG. 6B is an illustration superimposing the light intensity spectrum 602 of FIG. 6A as linear contours 610, 620, and 630 in schematic form. The linear contours 610, 620, and 630 illustrated in FIG. 6B represents zones of equal light intensity. The emitted light rays 680 as shown in FIG. 6B illustrates the direction in which the light rays coming from the light source 1000 may be directed by the offset cylindrical lens 660. Unlike FIG. 5B, the emitted light rays 680 in FIG. 6B, do not extend symmetrically about both sides of the main light emitting axis 550. As shown in FIG. 6B, due to inclusion of the offset cylindrical lens 660, the central axis 650 is offset from the main light emitting axis 550. This shift of the main light emitting axis 550 to central axis 650, indicates deflection of the emitted light rays 680 away from the printing axis 560. The cylindrical lens 660, as shown in FIG. 6B, can be of various geometrical configuration.

Figure 7B:
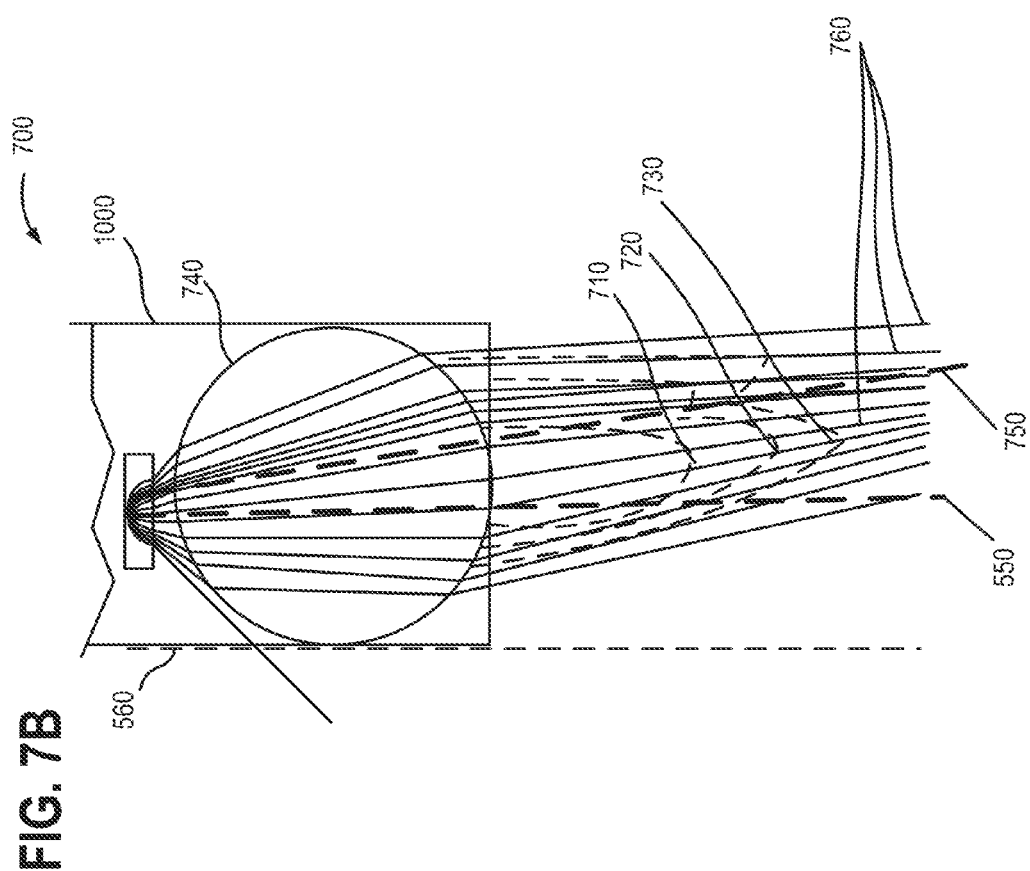
FIGS. 7A and 7B are side cross-sectional views of a light emission spectrum from a light source.
Figure 7A:
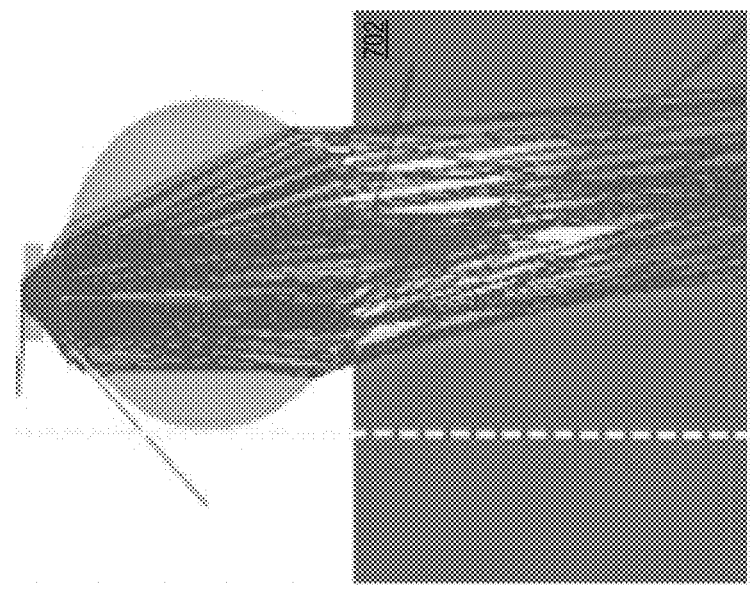

A situation similar to FIGS. 6A and 6B is represented in FIGS. 7A and 7B. FIGS. 7A and 7B show side cross-sectional views of light emission spectrum from a light source with offset rod lens 740. FIG. 7A further illustrates a shaded light intensity spectrum 702 of light emitted from light source 1000. FIG. 7B is an illustration superimposing the light intensity spectrum 702 of FIG. 6A as linear contours 710, 720, and 730 in schematic form. The linear contours 710, 720, and 730 illustrated in FIG. 7B represent zones of equal light intensity. Unlike FIG. 5B, the emitted light rays 760 in FIG. 7B, do not extend symmetrically about both sides of the main light emitting axis 550. FIG. 7B illustrates the direction in which the light rays emitted from the light source 1000 may be directed by the offset rod lens 740. As shown in FIG. 7B, the central axis 750 is offset from the main light emitting axis 550. This shift of the main light emitting axis 550 to central axis 750, indicates deflection of the emitted light rays 760 away from the printing axis 560. Inclusion of the rod lens 740, allows the emitted light rays 760 to be deflected away from the printing axis 560. Additionally, inclusion of rods lens 740, concentrates the light rays 760 on the target substrate 440. In comparison to emitted light rays 570 in FIG. 5B and emitted light rays 680 in FIG. 6B, emitted light rays 760 in FIG. 7B may be more concentrated, with more focused emitted light rays deflected away from the main light emitting axis 550 towards the target substrate 440, described above in FIG. 4A. The increased concentration of the emitted light rays 760 in comparison to emitted light rays 570 and emitted light rays 680, has the potential advantage of increasing curing rate and increasing efficiency of the printing and curing system.

Referring now to FIG. 8, it illustrates a block diagram for an example configuration of lighting system 1400. As an example, printing and curing system may comprise lighting system 1400, wherein a printer 410 including a printer head 430 may be positioned adjacent to a lighting system 1400. For example, FIG. 4B illustrates a printing and curing system wherein a printer 410 is positioned adjacent to a light source 1000 (e.g., a lighting subsystem).

In one example, lighting system 1400 may comprise a light-emitting subsystem 1412, a controller 1414, a power source 1416 and a cooling subsystem 1418. The light-emitting subsystem 1412 may comprise a plurality of semiconductor devices 1419. The plurality of semiconductor devices 1419 may be a linear array 1420 of light-emitting elements such as a linear array of LED devices, for example. Semiconductor devices may provide radiant output 1424. The radiant output 1424 may be directed to a workpiece 1426 located at a fixed plane from lighting system 1400. Furthermore, the linear array of light-emitting elements may be an edge weighted linear array of light-emitting elements, wherein one or more methods are employed to increase the useable length of light output at workpiece 1426. For example, one or more of edge weighted spacing, lensing (e.g. providing coupling optics) of individual light-emitting elements, providing individual light-emitting elements of different intensity, and supplying differential current to individual LEDs may be employed as described above.

The radiant output 1424 may be directed to the workpiece 1426 via coupling optics 1430. The coupling optics 1430, if used, may be variously implemented. As an example, the coupling optics may include one or more layers, materials or other structures interposed between the semiconductor devices 1419 and window 1464, and providing radiant output 1424 to surfaces of the workpiece 1426. As an example, the coupling optics 1430 may include a micro-lens array to enhance collection, condensing, collimation or otherwise the quality or effective quantity of the radiant output 1424. As another example, the coupling optics 1430 may include a micro-reflector array. In employing such a micro-reflector array, each semiconductor device providing radiant output 1424 may be disposed in a respective micro-reflector, on a one-to-one basis. As another example, a linear array of semiconductor devices 1420 providing radiant output 24 and 25 may be disposed in macro-reflectors, on a many-to-one basis. In this manner, coupling optics 1430 may include both micro-reflector arrays, wherein each semiconductor device is disposed on a one-to-one basis in a respective micro-reflector, and macro-reflectors wherein the quantity and/or quality of the radiant output 1424 from the semiconductor devices is further enhanced by macro-reflectors.

Each of the layers, materials or other structure of coupling optics 1430 may have a selected index of refraction. By properly selecting each index of refraction, reflection at interfaces between layers, materials and other structures in the path of the radiant output 1424 may be selectively controlled. As an example, by controlling differences in such indexes of refraction at a selected interface, for example window 1464, disposed between the semiconductor devices to the workpiece 1426, reflection at that interface may be reduced or increased so as to enhance the transmission of radiant output at that interface for ultimate delivery to the workpiece 1426. For example, the coupling optics may include a dichroic reflector where certain wavelengths of incident light are absorbed, while others are reflected and focused to the surface of workpiece 1426.

The coupling optics 1430 may be employed for various purposes. Example purposes include, among others, to protect the semiconductor devices 1419, to retain cooling fluid associated with the cooling subsystem 1418, to collect, condense and/or collimate the radiant output 1424, or for other purposes, alone or in combination. As a further example, the lighting system 1400 may employ coupling optics 1430 so as to enhance the effective quality, uniformity, or quantity of the radiant output 1424, particularly as delivered to the workpiece 1426.

As a further example, coupling optics 1430 may comprise a cylindrical Fresnel lens such as a linear cylindrical Fresnel lens for collimating and/or focusing the light emitted from the linear array 1420 of semiconductor devices 1419. In particular, a cylindrical Fresnel lens may be aligned with the linear array 1420, wherein emitted light therefrom is emitted through the cylindrical Fresnel lens and wherein the cylindrical Fresnel lens reduces the angular spread of light in a widthwise axis of the linear array, the linear array spanning a lens length. In some examples, a cylindrical Fresnel lens may be used in place of a window, such as window 1020, as shown in FIG. 15. The cylindrical Fresnel lens may be a single-groove lens or a multiple groove lens to further reduce the angular spread of emitted light in a widthwise axis as compared to a single cylindrical Fresnel lens.

Selected of the plurality of semiconductor devices 1419 may be coupled to the controller 1414 via coupling electronics 1422, so as to provide data to the controller 1414. As described further below, the controller 1414 may also be implemented to control such data-providing semiconductor devices, e.g., via the coupling electronics 1422. The controller 1414 may be connected to, and may be implemented to control, the power source 1416, and the cooling subsystem 1418. For example, the controller may supply a larger drive current to light-emitting elements distributed in the middle portion of linear array 1420 and a smaller drive current to light-emitting elements distributed in the end portions of linear array 1420 in order to increase the useable length of light irradiated at workpiece 1426. Moreover, the controller 1414 may receive data from power source 1416 and cooling subsystem 1418. In one example, the irradiance at one or more locations at the workpiece 1426 surface may be detected by sensors and transmitted to controller 1414 in a feedback control scheme. In a further example, controller 1414 may communicate with a controller of another lighting system (not shown in FIG. 8) to coordinate control of both lighting systems. For example, controller 1414 of multiple lighting systems may operate in a master-slave cascading control algorithm, where the set point of one of the controllers is set by the output of the other controller. Other control strategies for operation of lighting system 10 in conjunction with another lighting system may also be used. As another example, controller 1414 for multiple lighting systems arranged side by side may control lighting systems in an identical manner for increasing uniformity of irradiated light across multiple lighting systems.

In addition to the power source 1416, cooling subsystem 1418, and light-emitting subsystem 1412, the controller 1414 may also be connected to, and implemented to control internal element 1432, and external element 1434. Element 1432, as shown, may be internal to the lighting system 1410, while element 1434, as shown, may be external to the lighting system 1410, but may be associated with the workpiece 1426 (e.g., handling, cooling or other external equipment) or may be otherwise related to a photoreaction (e.g. curing) that lighting system 1410 supports.

The data received by the controller 1414 from one or more of the power source 1416, the cooling subsystem 1418, the light-emitting subsystem 1412, and/or elements 1432 and 1434, may be of various types. As an example, the data may be representative of one or more characteristics associated with coupled semiconductor devices 1419. As another example, the data may be representative of one or more characteristics associated with the respective light-emitting subsystem 1412, power source 1416, cooling subsystem 1418, internal element 1432, and external element 1434 providing the data. As still another example, the data may be representative of one or more characteristics associated with the workpiece 1426 (e.g., representative of the radiant output energy or spectral component(s) directed to the workpiece). Moreover, the data may be representative of some combination of these characteristics.

The controller 1414, in receipt of any such data, may be implemented to respond to that data. For example, responsive to such data from any such component, the controller 1414 may be implemented to control one or more of the power source 1416, cooling subsystem 1418, light-emitting subsystem 1412 (including one or more such coupled semiconductor devices), and/or the elements 32 and 34. As an example, responsive to data from the light-emitting subsystem indicating that the light energy is insufficient at one or more points associated with the workpiece, the controller 1414 may be implemented to either (a) increase the power source's supply of power to one or more of the semiconductor devices, (b) increase cooling of the light-emitting subsystem via the cooling subsystem 1418 (e.g., certain light-emitting devices, if cooled, provide greater radiant output), (c) increase the time during which the power is supplied to such devices, or (d) a combination of the above.

In the example where a printing and curing system comprises lighting system 1400, controller 1414 may also receive input from light sensors 436 at a printer head. For example, in response to a measured intensity of light reflected from workpiece 1426 onto the printer head, controller 1414 may adjust a transverse offset of the optical element (e.g., coupling optics 1430 of lighting system 1400) in order to reduce the intensity of light reflected from workpiece 1426 onto the printer head.

Individual semiconductor devices 1419 (e.g., LED devices) of the light-emitting subsystem 1412 may be controlled independently by controller 1414. For example, controller 1414 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same linear array 1420 of semiconductor devices, or may be from more than one linear array of semiconductor devices 1420 from multiple lighting systems 1400. Linear array 1420 of semiconductor device may also be controlled independently by controller 1414 from other linear arrays of semiconductor devices in other lighting systems. For example, the semiconductor devices of a first linear array may be controlled to emit light of a first intensity, wavelength, and the like, while those of a second linear array in another lighting system may be controlled to emit light of a second intensity, wavelength, and the like.

As a further example, under a first set of conditions (e.g. for a specific workpiece, photoreaction, and/or set of operating conditions) controller 1414 may operate lighting system 1410 to implement a first control strategy, whereas under a second set of conditions (e.g. for a specific workpiece, photoreaction, and/or set of operating conditions) controller 1414 may operate lighting system 1410 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, but the different group of LED devices may include a subset of one or more LED devices from the second group.

The cooling subsystem 1418 may be implemented to manage the thermal behavior of the light-emitting subsystem 1412. For example, the cooling subsystem 1418 may provide for cooling of light-emitting subsystem 1412, and more specifically, the semiconductor devices 1419. The cooling subsystem 1418 may also be implemented to cool the workpiece 1426 and/or the space between the workpiece 1426 and the lighting system 1410 (e.g., the light-emitting subsystem 1412). For example, cooling subsystem 1418 may comprise an air or other fluid (e.g., water) cooling system. Cooling subsystem 1418 may also include cooling elements such as cooling fins attached to the semiconductor devices 1419, or linear array 1420 thereof, or to the coupling optics 1430. For example, cooling subsystem may include blowing cooling air over the coupling optics 1430, wherein the coupling optics 1430 are equipped with external fins to enhance heat transfer.

The lighting system 1410 may be used for various applications. Examples include, without limitation, curing applications ranging from ink printing to the fabrication of DVDs and lithography. The applications in which the lighting system 1410 may be employed can have associated operating parameters. That is, an application may have associated operating parameters as follows: provision of one or more levels of radiant power, at one or more wavelengths, applied over one or more periods of time. In order to properly accomplish the photoreaction associated with the application, optical power may be delivered at or near the workpiece 1426 at or above one or more predetermined levels of one or a plurality of these parameters (and/or for a certain time, times or range of times).

In order to follow an intended application's parameters, the semiconductor devices 1419 providing radiant output 1424 may be operated in accordance with various characteristics associated with the application's parameters, e.g., temperature, spectral distribution and radiant power. At the same time, the semiconductor devices 1419 may have certain operating specifications, which may be associated with the semiconductor devices' fabrication and, among other things, may be followed in order to preclude destruction and/or forestall degradation of the devices. Other components of the lighting system 1410 may also have associated operating specifications. These specifications may include ranges (e.g., maximum and minimum) for operating temperatures and applied electrical power, among other parameter specifications.

Accordingly, the lighting system 1410 may support monitoring of the application's parameters. In addition, the lighting system 1410 may provide for monitoring of semiconductor devices 1419, including their respective characteristics and specifications. Moreover, the lighting system 1410 may also provide for monitoring of selected other components of the lighting system 1410, including its characteristics and specifications.

Providing such monitoring may enable verification of the system's proper operation so that operation of lighting system 1410 may be reliably evaluated. For example, lighting system 1410 may be operating improperly with respect to one or more of the application's parameters (e.g. temperature, spectral distribution, radiant power, and the like), any component's characteristics associated with such parameters and/or any component's respective operating specifications. The provision of monitoring may be responsive and carried out in accordance with the data received by the controller 1414 from one or more of the system's components.

Monitoring may also support control of the system's operation. For example, a control strategy may be implemented via the controller 1414, the controller 1414 receiving and being responsive to data from one or more system components. This control strategy, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power source 1416 that adjust power applied to the light-emitting subsystem 1412 and/or through control signals directed to the cooling subsystem 1418 that adjust cooling applied to the light-emitting subsystem 1412.

Control strategies may be employed to enable and/or enhance the system's proper operation and/or performance of the application. In a more specific example, control may also be employed to enable and/or enhance balance between the linear array's radiant output and its operating temperature, so as, e.g., to preclude heating the semiconductor devices 1419 beyond their specifications while also directing sufficient radiant energy to the workpiece 1426, for example, to carry out a photoreaction of the application. Furthermore, in some examples, a controller may be used to automatically adjust the offset position of a lens relative to a main light emitting axis of a light source in order to adjust the angular deflection of light emitted from a light source 1000 towards a target substrate 440. Accordingly, a printing and curing system may be automatically adjusted to various curing conditions and target substrates in a continuous manner without having to manually adjust the printing and curing system.

In some applications, high radiant power may be delivered to the workpiece 1426, and the workpiece 1426 may comprise a light-curable material, including a substrate with a light-curable material printed thereon. Accordingly, the light-emitting subsystem 1412 may be implemented using a linear array of light-emitting semiconductor devices 1420. For example, the light-emitting subsystem 1412 may be implemented using a high-density, light-emitting diode (LED) array. Although LED arrays may be used and are described in detail herein, it is understood that the semiconductor devices 1419, and linear arrays 1420 thereof, may be implemented using other light-emitting technologies without departing from the principles of the invention; examples of other light-emitting technologies include, without limitation, organic LEDs, laser diodes, other semiconductor lasers.

In this manner, a printing and curing system may comprise a lighting module, including an array of light-emitting elements, coupling optics, and a controller with executable instructions to position the coupling optics over the array, wherein a central axis of the light-emitting element is offset from a first axis of the array of light-emitting elements, irradiate light about a first axis from the array of light-emitting elements towards a light-curable surface, direct the irradiated light through the coupling optics, and deflect the irradiated light directed through the coupling optics asymmetrically away from the first axis towards the light-curable surface. The coupling optics may comprise a reflector, and/or a cylindrical lens, wherein the cylindrical lens comprises a Fresnel lens, and/or a rod lens.

Deflecting the irradiated light directed through the optical element asymmetrically away from the first axis may comprise deflecting the irradiated light about a second axis, wherein the second axis is angled at a deflecting angle to the first axis. Furthermore, the printing and curing system may comprise executable instructions to increase the deflecting angle by increasing an offset between the central axis and the first axis.

Turning now to FIG. 11A, it illustrates a schematic frontal perspective view of an optical element module 1100 comprising an example rods lens 1110, mounted in an optical element housing 1120. Fastening holes 1170 in optical element housing 1120 may be used for mounting hardware such as screws to secure a lens (e.g., rod lens 1110) to the optical element housing 1120, and for securing a mounting plate 1130 to optical element housing 1120. Mounting plate 1130 and housing region 1180 may be transparent such that light rays 1190 from a light source may be transmitted unhindered through mounting plate 1130 and through rod lens 1110. The rod lens 1110 can be of various geometries and the outer dimensions of the optical element housing 1120 can be modular such that different optical element housings may be used to accommodate various types of rod lenses or other lens geometries. Accordingly, mounting the optical element module 1100 in a lighting module may automatically align a main light-emitting axis of a light source to be offset from the optical element. In particular, as shown in FIGS. 11A and 11B, optical element housing 1120 may comprise unequal optical element supports 1152 and 1154 extending along the length of optical element housing 1120 so that when rod lens 1110 is mounted, a central axis 1118 of rod lens is parallel, but offset from a main light-emitting axis 1136.

The side surface 1140 of the rod lens 1110 may be positioned to be flush with the side surface 1150 of the optical element housing 1120. Additionally, the front surface 1116 of the rod lens may be flush with or slightly protrude from the front surface of the optical element housing 1120. In this manner the optical element housing 1120 may not interfere or block light emitted from the rod lens 1110. In addition, when optical element module 1100 is mounted in the lighting module, the front surface 1116 of the rod lens may be flush with or slightly recessed from the front cover 1016 of the light source housing 1010, described in FIGS. 4A and 4B, such that the front cover 1016 remains flush with the bottom surface 450 of the printer head 430. Furthermore, a central axis 1118 of the rod lens 1110 may be offset from a main light emitting axis 1136 of the light source 1000 (not shown in FIG. 11) so that the rod lens can deflect emitted light rays away from the printer head and towards a target substrate 440.

FIG. 11B illustrates a cross-sectional view of optical element module 1100 taken at section 11B-11B taken in a plane defined by longitudinal axis 1162 and a transverse axis 1164. The optical element housing 1120 positions the mounted optical element (e.g. rod lens 1110) apart from the light source in a longitudinal direction. Optical element supports 1152 and 1154 are of unequal length to facilitate mounting of rod lens 1110 in optical element housing 1120, wherein the rod lens 1110 is transversely offset from the main light-emitting axis 1136. The offset may refer to wherein a central axis 1118 is transversely offset from a main light-emitting axis 1136 by an offset 1148. Furthermore, both mounting plate 1130 and region 1180 of the optical element housing between the optical element (e.g., rod lens 1110) and the light source may be transparent so that light rays 1190 centered about a main light-emitting axis 1136 from a light source may be transmitted unhindered through mounting plate 1130, region 1180 before reaching the optical element (e.g., rod lens 1110). As an example, region 1180 may be a hole, gap or cutout in the optical element housing 1120, similar to recessed lens region 906 of optical element module 900.

Turning now to FIG. 13, it illustrates an example flow chart of a method 1300 of irradiating a light-curable material. Method 1300 begins at 1310 where light may be irradiated about a first axis, for example a main light-emitting axis of a light source, towards a light-curable surface. The light source may be a high aspect ratio array of light-emitting elements such as a linear array of LEDs. In another example, the light source may be a Lambertian or near-Lambertian light source, wherein the irradiated light from the light source is emitted symmetrically about a first axis. Furthermore, the light may be irradiated from a printing and curing system, comprising a printer and a light source. A printer head of the printer may be adjacent to and aligned in a plane with a front cover of the light source, wherein the plane is positioned over the light-curable substrate. In this way, light-curable material dispensed from the print head onto the substrate may form a light-curable surface. The light-curable surface may be cured in an expedient manner by emitting light from the light source adjacent to the printer head and aligned in the plane therewith.

Method 1310 continues at 1320 where the irradiated light is directed through an offset optical element. As shown in FIG. 11B, a central axis of the optical element may be offset in a transverse direction relative to the first axis. Furthermore, the optical element may be positioned between the light source and the light-curable surface. The optical element may be a lens such as a cylindrical lens, a rod lens, a Fresnel lens, and the like. The optical element may also comprise a reflector, diffractor, refractor, or collimator whose central axis is transversely offset from the first axis.

Next, method 1300 continues at 1330 where the irradiated light is deflected asymmetrically away from the first axis towards the light-curable surface. Deflecting the irradiated light may comprise one or more of reflecting, diffracting, refracting, and collimating the irradiated light. Because the optical element is transversely offset from the first axis of the light source, the irradiated light is deflected asymmetrically away from the first axis. In this manner, light emitted from the light source onto the light-curable substrate may be reflected away from the printer head, thereby reducing curing of light-curable material at the printer head.

At 1340, method 1300 continues by determining if a deflecting angle is to be increased or decreased, thereby increasing or decreasing the deflecting angle of the deflected light from the optical element. As an example, a deflecting angle may be increased to reduce an intensity of light reflected from the light-curable surface onto the printer head. In this manner, curing of light-curable material (e.g., UV-curable ink, and the like) at the printer head may be reduced. Conversely, a deflecting angle may be reduced if an intensity of light irradiating the light-curable surface is to be increased, for example, to increase a curing rate. In one example, a printer head surface may comprise sensors to measure the irradiance of light reflected from the light-curable surface at the printer head.

At 1350, if the deflecting angle is to be adjusted, a transverse offset of the central axis of the optical element may be adjusted relative to the main light-emitting axis of the light source. For example, if the sensors detect a higher irradiance of light reflected from the light-curable surface (or if curing of light-curable material at the printer head is observed), then a transverse offset of the optical element from the main light-emitting axis (e.g., first axis) of the light source may be increased. Conversely, if the sensors detect a lower irradiance of light reflected from the light-curable surface, then a transverse offset of the optical element from the main light-emitting axis (e.g., first axis) of the light source may be maintained, or may be reduced in order to increase curing rate. As described above, the transverse offset may be adjusted manually by changing a mounted alignment position of the optical element in the optical element module. In another example, the transverse offset may be adjusted automatically by a controller.

In some examples, the optical element may be mounted in an optical element housing, similar to optical element housing 1120, to form an optical element module. Furthermore, securely mounting the optical element module to a light source may position the optical element so that its central axis is transversely offset from the main light-emitting axis of the light source. Furthermore, the optical element housing may comprise alignment grooves so that a mounting position of the optical element in the optical element housing may be adjusted. In this way, a magnitude or degree of transverse offset may be adjusted by adjusting the mounting position of the optical element in the optical element housing.

In other examples, a controller may adjust the magnitude of transverse offset of the optical element module by actuating electromechanical servomechanisms to which the optical element module may be mounted. By translating the optical element module in a transverse direction relative to the light source, the controller may adjust the offset of the optical element relative to the light source. After 1350, method 1300 ends.

In this manner, a method of irradiating a light-curable material may comprise irradiating light about a first axis from an array of light-emitting elements towards a light-curable surface, directing the irradiated light through an optical element interposed between the array of light-emitting elements and the light-curable surface, wherein a central axis of the optical element is offset from the first axis, deflecting the irradiated light directed through the optical element asymmetrically away from the first axis towards the light-curable surface. The central axis may be parallel to but not coincident with the first axis. Furthermore, the irradiated light may be directed through an optical element comprising a cylindrical lens. Further still, deflecting the irradiated light may comprise asymmetrically collimating the irradiated light directed through the optical element towards the light-curable surface, asymmetrically refracting the irradiated light directed through the optical element towards the light-curable surface, asymmetrically diffracting the irradiated light directed through the optical element towards the light-curable surface, and/or asymmetrically reflecting the irradiated light directed through the optical element towards the light-curable surface.

Deflecting the irradiated light directed through the optical element asymmetrically away from the first axis may comprise deflecting the irradiated light about a second axis, wherein the second axis is angled at a deflecting angle to the first axis. Furthermore, the method may further comprise increasing the deflecting angle by increasing an offset between the central axis and the first axis.

Figure 14A:
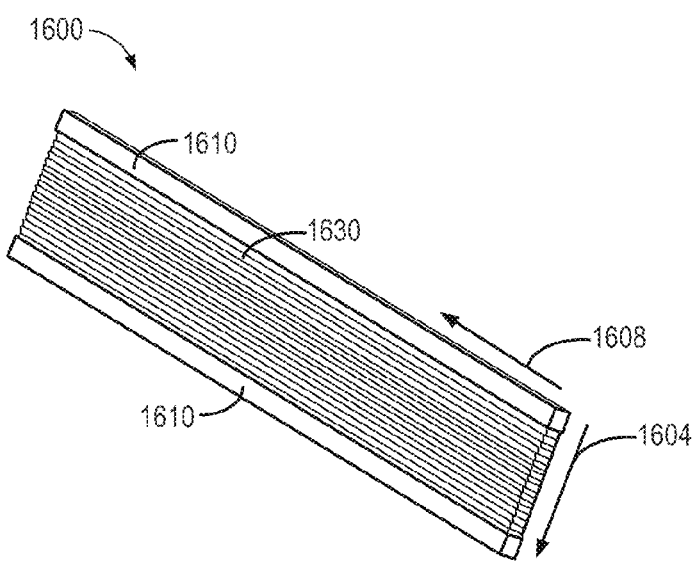
FIGS. 14A and 14C are perspective views of example cylindrical Fresnel lenses.
Figure 14B:
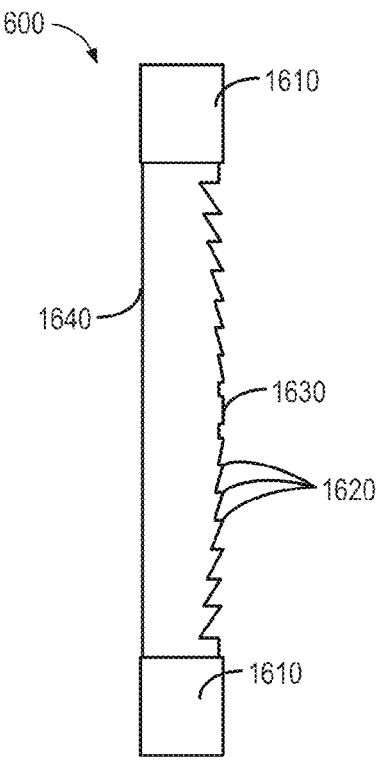
FIGS. 14B and 14D are cross-sections of the example cylindrical Fresnel lenses of 14A and 14C, respectively.

Turning now to FIGS. 14A and 14B, they illustrate perspective and cross-section views, respectively, of an example of a multiple-groove cylindrical Fresnel lens 1600. The multiple-groove cylindrical Fresnel lens in FIGS. 14A and 14B have sixteen grooves 1620, however in other examples, a multiple-groove cylindrical Fresnel lens may have fewer or more grooves. As an example, a multiple-groove cylindrical Fresnel lens may comprise 50 grooves. As a further example, a cylindrical Fresnel lens may comprise a single-groove cylindrical Fresnel lens 1602 having a single groove 1650 (e.g., a single prism) centered around a central lens axis 1660, as illustrated by the perspective and cross-section views of FIGS. 14C and 14D, respectively. In general, as the number of grooves in a cylindrical Fresnel lens is increased, the thickness of the lens may decrease. In some examples, linear cylindrical Fresnel lenses may be manufactured from glass by a glass molding process, or optically transparent plastic. Glass lenses may be dimensionally more heat stable at higher heat loads or higher temperatures, such as temperatures above 120° C., as compared to plastic. However, glass cylindrical Fresnel lenses comprising a large number of grooves may be more difficult to manufacture precisely, as compared to plastic cylindrical Fresnel lenses because it may be difficult to achieve the fine sharp edges and points precisely by glass molding. For example, glass molded lenses may tend to have rounded edges and it may be more difficult to achieve multiple grooves of a fine pitch for lenses with large numbers of grooves. Manufacturing Fresnel lenses using plastic may allow achieving sharper prism ridges and finer prism pitch surfaces for Fresnel lenses with multiple grooves.

In order to collimate and reduce angular spread of emitted light in a widthwise axis 1604, the one or more cylindrical Fresnel grooves may be oriented parallel to the lengthwise axis 1608 of the light source. Furthermore, the cylindrical Fresnel lens may be oriented in a groove-in orientation, wherein the cylindrical Fresnel lens grooved surface 1630 faces towards the light source and the planar lens surface 1640 faces away from the light source, or a groove-out orientation, wherein the cylindrical Fresnel lens grooved surface 1630 faces away from the light source and the planar lens surface 1640 faces towards from the light source. The groove-in and groove-out orientation of the cylindrical Fresnel lens may impact the transmission efficiency of light through the cylindrical Fresnel lens. The geometry and shapes of the grooves of the cylindrical Fresnel lenses shown in FIGS. 14A, 14B, 14C, and 14D are for illustrative purposes and may not be drawn to scale. The cylindrical Fresnel lens may further comprise transparent lengthwise edges 1610. As an example, the cylindrical Fresnel lens may mount to the light source at the lengthwise edges 1610, or may mount in an optical element housing analogously to the optical element housing shown in FIG. 11. Furthermore, a central axis 1632 of the Fresnel lens may be offset from a main light-emitting axis of a light source in order to deflect emitted light from the light source away from a printer head in a printing and curing system (similar to FIG. 4B) to reduce reflection of light from a target substrate to the printer head, curing of light-curable material at the printer head, and printer head degradation.

Figure 14C:
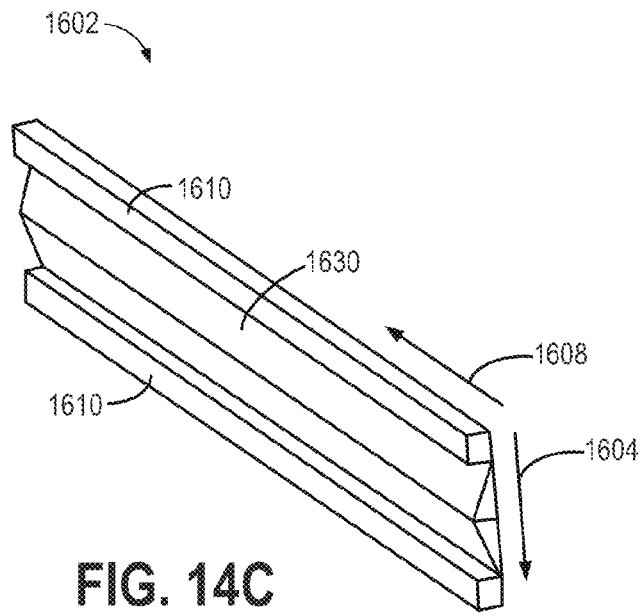
Figure 14D:
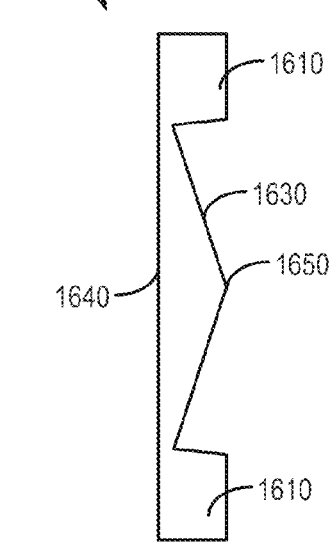

Turning now to FIG. 15, it illustrates a partial side perspective view of another example light source 1700. Light source 1700 may be similar to above-described light source 1000, and may further comprise coupling optics. For example, coupling optics of light source 1700 may comprise a cylindrical lens, for example cylindrical Fresnel lens 1720. Similar to light sources 1000, FIG. 15 also shows light source 1700 including front cover 1016, fasteners 1030, housing sidewalls 1018, and the linear array of light-emitting elements 1090. Cylindrical Fresnel lens 1720 may comprise a single-groove or multiple-groove cylindrical Fresnel lens (e.g., cylindrical Fresnel lenses as shown in FIGS. 14C and 14A respectively), wherein cylindrical Fresnel lens 1720 may comprise one or more grooves 1722 on a grooved surface 1724. Cylindrical Fresnel lens 1720 may have a groove-in orientation wherein grooved surface 1724 may face towards the light-emitting elements 1090 and planar surface 1728 may face away from the light-emitting elements 1090 as shown in FIG. 15. Alternately, cylindrical Fresnel lens 1720 may have a groove-out orientation, wherein grooved surface 1724 may face away from the light-emitting elements 1090 and a planar surface 1728 of cylindrical Fresnel lens may face towards the light-emitting elements 1090. Both planar surface 1728 and sidewalls 1786 of cylindrical Fresnel lens are transparent. Accordingly, a portion of light irradiated from end portion light-emitting elements adjacent to and near lens sidewalls 1786 may be irradiated through lens sidewalls 1786. Irradiation of light through lens sidewalls 1786 of light sources may thereby reduce non-uniformities in irradiated light across multiple light sources arranged adjacently side by side as compared to conventional light sources arranged side by side. Lens sidewalls 1786 may be flush with the sides of front cover 1016 and housing sidewalls 1018 so that light sources can be placed side by side in a flush arrangement wherein a gap between the side by side light sources is reduced. To this end, fasteners 1030 mounted in housing sidewalls 1018 may also be recessed from the plane of housing sidewalls 1018 when fully secured. As previously described, aligning the lens sidewalls 1786 to be flush with the housing sidewalls may reduce spacing between and may maintain continuity of irradiated light across multiple light sources arranged side by side. Furthermore, lens sidewalls 1786 may extend perpendicularly back from the front plane. In this manner, multiple light sources may be aligned flush side by side wherein first and last light-emitting elements in the end portions of side by side light sources are positioned adjacent to lens sidewalls 1786, wherein the lens sidewalls 1786 span the length of the front plane of each light source housing. Positioning the first and last light-emitting elements in the linear arrays adjacent to lens sidewalls 1786 may allow side by side light sources to irradiate light across the entire length of the lens. Positioning the first and last light-emitting elements in the linear arrays adjacent to lens sidewalls 1786 may comprise positioning the first and last light-emitting elements wherein there may be a small gap (e.g., gap 1082) between the window sidewalls and the first and last light-emitting elements respectively.

As another example, light source 1700 may further comprise a transparent window (not shown) mounted in a front plane of the housing and covering the front face of the cylindrical Fresnel lens 1720, wherein a front face of the window is aligned approximately flush with the front plane of the housing, and window sidewalls are aligned flush with the housing sidewalls 1018. Aligning the lens sidewalls 1786 and window sidewalls to be flush with the housing sidewalls may reduce spacing between and may maintain continuity of irradiated light across multiple light sources arranged side by side.

Furthermore a central axis 1770 of the Fresnel lens may be transversely offset from a main light emitting axis 1772 of light-emitting elements of light source 1700. In this manner, light emitted from light source 1700 may be deflected by the Fresnel lens away from a printer head in a printing and curing system (similar to FIG. 4B) to reduce reflection of light from a target substrate to the printer head, curing of light-curable material at the printer head, and printer head degradation.

In this manner, a lighting module may comprise an array of light-emitting elements, the array emitting light symmetrically about a first axis towards a light-curable surface, and an optical element, interposed between the array and the light-curable surface, wherein a central axis of the optical element is offset from the first axis to asymmetrically direct the emitted light from the array of light-emitting elements away from the first axis towards the light-curable substrate. The lighting module may further comprise an optical element housing, the optical element mounted in the optical element housing to form an optical element module, and wherein upon mounting the optical element module in the lighting module, the central axis is offset from the first axis. The optical element module may comprise a removably mountable optical element module. Furthermore, the lighting module may further comprise a plurality of optical element modules, each of the plurality of optical element modules having a different optical element mounted therein, and wherein each of the optical element modules may be interchangeably mounted one at a time to the lighting module, wherein the central axis is offset from the first axis. Further still, the optical element housing may comprise a plurality of alignment ridges 908, each of the plurality of alignment ridges 908 corresponding to a different offset between the central axis and the first axis when aligned with a mounting edge of the optical element. The mounting edge may comprise a groove or alignment mark on one side face of the optical element.

Note that the example control and estimation routines included herein can be used with various lighting sources and lighting system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to various Lambertian or near-Lambertian light sources. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   emitting radiation from an array of light-emitting elements symmetrically about a longitudinal axis of the array and through an optical element toward a light-curable surface;
   in response to a first condition, comprising an irradiance intensity of reflected radiation from the light-curable surface deviating from a desired intensity by more than a threshold deviation,
   adjusting a transverse offset between a central axis of the optical element and the longitudinal axis to redirect the emitted radiation about a tilted axis, the tilted axis being tilted at an angle relative to the longitudinal axis based on a magnitude of the transverse offset.

2. The method of claim 1, wherein the first condition comprises the irradiance intensity of reflected radiation being greater than the desired intensity by more than the threshold deviation, and adjusting the transverse offset comprises increasing the transverse offset between the central axis of the optical element and the longitudinal axis to increase the angle of the tilted axis.

3. The method of claim 2, wherein the first condition comprises the irradiance intensity of reflected radiation being less than the desired intensity by more than the threshold deviation, and adjusting the transverse offset comprises decreasing the transverse offset between the central axis of the optical element and the longitudinal axis to decrease the angle of the tilted axis.

4. The method of claim 3, further comprising positioning the optical element such that the central axis is parallel to the longitudinal axis.

5. The method of claim 4, further comprising positioning a printer head adjacent to the array of light-emitting elements, and dispensing light-curable material from the printer head onto the light-curable surface.

6. The method of claim 5, further comprising measuring the irradiance intensity of reflected radiation at a printer head surface.

7. The method of claim 6, further comprising, in response to an irradiance intensity of the emitted radiation at the light-curable surface being less than a threshold irradiance intensity, decreasing the transverse offset between the central axis of the optical element and the longitudinal axis to decrease the angle of the tilted axis.

8. The method of claim 7, further comprising, in response to the irradiance intensity of the emitted radiation at the light-curable surface being greater than a threshold irradiance intensity, increasing the transverse offset between the central axis of the optical element and the longitudinal axis to increase the angle of the tilted axis.

9. A method, comprising:

adjustably positioning an optical element in an optical element module, a position of the optical element adjustable in a transverse direction to a central axis of the optical element, detachably mounting the optical element module to a lighting module comprising an array of light-emitting elements emitting radiation symmetrically about a first axis, wherein the central axis is parallel to the first axis, positioning the lighting module over a radiation-curable surface, and adjusting the position of the optical element to offset the central axis from the first axis, wherein radiation emitted from the light-emitting elements about the first axis and through the offset optical element is propagated asymmetrically away from the first axis in a direction towards the offset on to the radiation-curable surface.

10. The method of claim 9, further comprising, upon detaching the mounted optical element module from the lighting module, propagating radiation emitted from the light-emitting elements to the radiation-curable surface symmetrically about the first axis.

11. The method of claim 10, wherein propagating the emitted radiation asymmetrically away from the first axis includes deflecting the emitted radiation about a deflecting axis, wherein an angle between the deflecting axis and the first axis is based on a magnitude of the offset between the central axis and the first axis.

12. The method of claim 11, further comprising adjustably positioning the optical element in the optical element module, wherein a length of the optical element spans a length of the array of light-emitting elements along the first axis.

13. The method of claim 12, further comprising:

positioning a printing head adjacent to the lighting module, and dispensing radiation-curable material about a printing axis parallel to the first axis on to the radiation-curable surface.

14. The method of claim 13, further comprising, in response to positioning the printing head adjacent to the lighting module, adjusting the position of the optical element to offset the central axis from the first axis away from the printing head.

15. A lighting module, comprising:

an array of light-emitting elements positioned within a lighting module housing to emit radiation symmetrically about a longitudinal axis of the array, an optical element adjustably positioned in an optical element module, the optical element module detachably mounted to the lighting module housing, wherein a position of the optical element is adjustable in a direction transverse to the central axis of the optical element, the emitted radiation is directed through the optical element, a central axis of the optical element is parallel to and transversely offset from the longitudinal axis, and upon passing through the optical element, the emitted radiation is deflected about a tilted axis of propagation away from the longitudinal axis toward the central axis.

16. The lighting module of claim 15, wherein upon detaching the optical element from the lighting module housing, the emitted radiation remains symmetrically irradiated about the longitudinal axis of the array.

17. The lighting module of claim 16, wherein a length of the optical element spans a length of the array along the longitudinal axis.

18. The lighting module of claim 17, wherein the optical element comprises a single contiguous optical element.

19. The lighting module of claim 18 wherein the array of light-emitting elements comprises a linear array of light-emitting elements.

* * * * *